May 27, 1958 E. Z. DELP ET AL 2,836,432
SUPPORT JACK FOR FORWARD END OF SEMI-TRAILER
Filed March 28, 1955
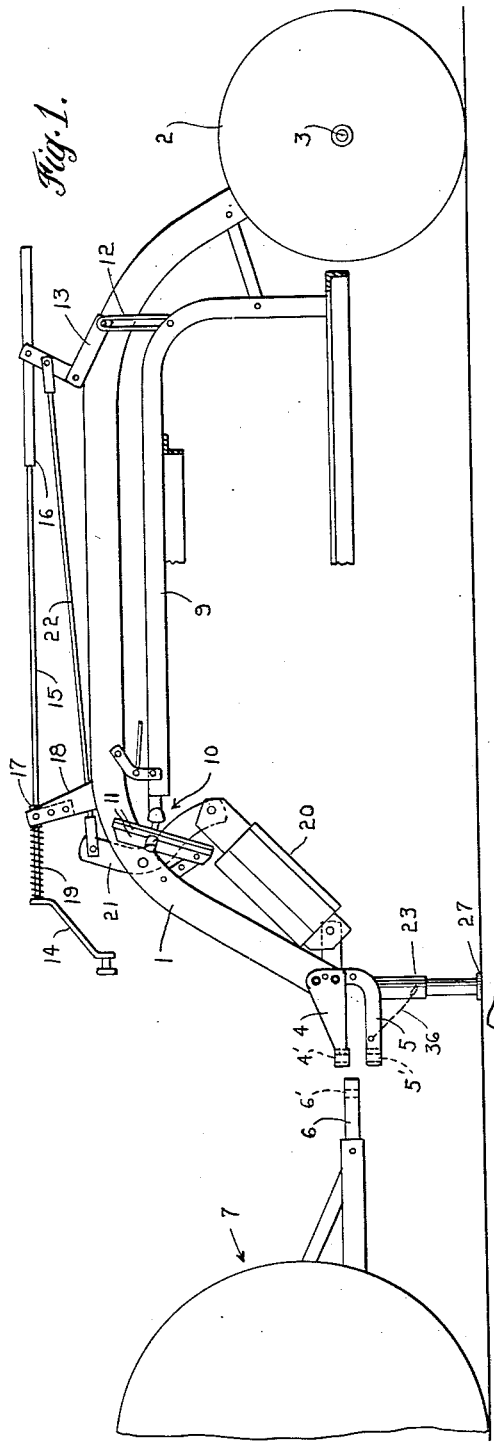
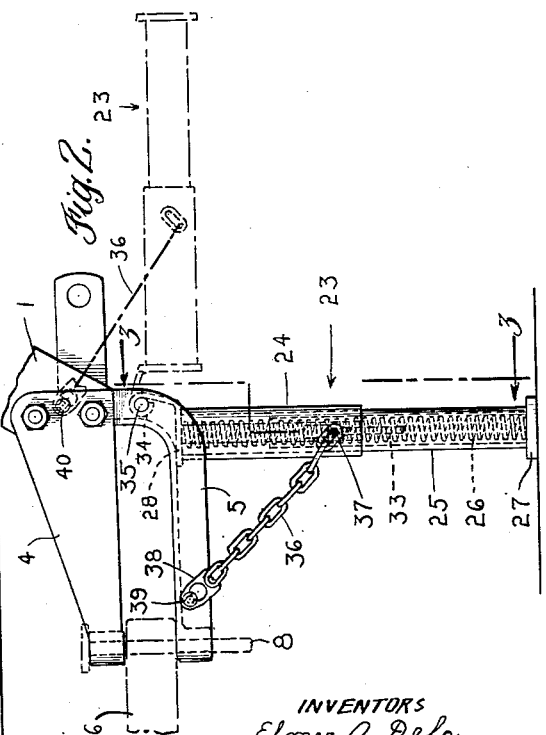
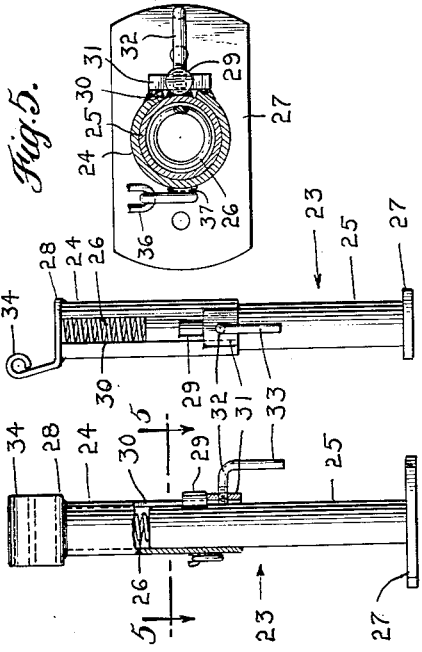
INVENTORS
Elmer Z. Delp
John Wm. Dughi
Richard E. Babcock Jr.
ATTORNEY

United States Patent Office 2,836,432
Patented May 27, 1958

2,836,432

SUPPORT JACK FOR FORWARD END OF SEMI-TRAILER

Elmer Z. Delp and John William Dughi, New Holland, Pa., assignors, by mesne assignments, to Sperry Rand Corporation, New Holland, Pa., a corporation of Delaware Application March 28, 1955, Serial No. 497,122

4 Claims. (Cl. 280—475)

This invention relates to a novel resilient support for the front end of a semi-trailer type wheeled chassis and to a new process of maneuvering a chassis equipped with such a support to greatly facilitate the coupling of the chassis to a tractor.

In accordance with the invention, the front end of the chassis when uncoupled from the tractor and parked rests on a depending resiliently downwardly projected support which floatingly carries the front end of the chassis and permits its angular vertical deflection about a fulcrum defined by the axle of the rear supporting wheels of the chassis.

It is an important feature of the invention to pivotally associate the support with the chassis so that it may rock on its base and permit horizontal or longitudinal movement of the chassis towad the drawbar or coupling element of a tractor while permitting the forward end of the chassis to be simultaneously manually vertically deflected to the proper height for cooperation with the coupling element.

A further important feature consists in providing such a support which, as an incident of the uncoupling of its associated chassis from the tractor, automatically adjusts to and can be selectively fixed at the proper length to accurately position the chassis for future recoupling. To this end, the support may be formed as a resiliently extensible rigid element pivoted to the chassis as above mentioned and including means for selectively maintaining the support at any of various degrees of elongation. Thus, during uncoupling of the chassis from the tractor when the support is swung downwardly into engagement with the ground and the chassis backed to cause erection of the same, the resiliently extensible support will be automatically compressed to the correct height and secured at such height or degree of elongation before the uncoupling is completed so that it may be recoupled to the same tractor without further adjustment or maneuvering.

Such a support also makes possible the maneuvering of the chassis by bouncing the front end of same up and down on the support and moving it laterally on its rear wheels in steps occurring near the peak of each bounce.

In addition, the invention includes a new process of thus maneuvering the chassis to facilitate its coupling to a tractor drawbar comprising bouncing the forward end of the chassis on the support at a frequency substantially equal to the natural frequency of oscillation of the chassis about the fulcrum defined by its rear axle, and moving the chassis laterally on its supporting wheels near the peak of each bounce to properly position it for coupling to the tractor drawbar.

Although the invention has been illustrated and described in the present application in association with the chassis or frame of a side delivery hay rake, it will be readily apparent that the invention is by no means limited to this specific application, but is adapted for general application to the chassis of any relatively light semi-trailer.

In the accompanying drawings:

Figure 1 represents a side elevational view of a hay rake (shown fragmentarily), the instant invention being incorporated in the rake chassis and the latter being shown with its hitch portion positioned adjacent the drawbar of a tractor preparatory to being coupled thereto;

Figure 2, an enlarged fragmentary side elevation of the hitch portion of the rake chassis showing the resilient support of the invention applied thereto, the support being shown in broken lines in its retracted position after the hitch portion has been coupled to the drawbar which, together with the hitch pin is shown in broken lines;

Figure 3, a sectional elevation on the line 3—3 of Figure 2;

Figure 4, a side elevation of the support of Figure 3; and,

Figure 5, a cross section on the line 5—5 of Figure 3.

Referring now in detail to the accompanying drawings, the hay rake there shown in part is generally similar to that disclosed, for example, in the U. S. patent to R. W. Johnson, No. 2,658,324 of November 10, 1953.

Such rake comprises the rigid medially upwardly arched chassis or frame structure 1, the rear or trailing end of which is supported on transversely opposed wheels such as 2 rotatably journaled on axle 3 which extends transversely to the line of movement of the frame. At its forward end the chassis 1 is provided with a hitch element, preferably in the form of a clevis having vertically opposed furcations 4 and 5 respectively adapted to extend above and below the rear drawbar 6 of a usual farm tractor 7, illustrated fragmentarily in Figure 1. The clevis is operatively coupled to the drawbar 6 in usual manner by a hitch pin 8 disposed through vertically registering openings 4', 5', and 6' in the clevis and in the drawbar.

In the instant disclosure, there are also included addition parts of a side delivery rake which are merely shown incidentally and constitute no part of the instant invention. These include the usual sub-frame 9 for supporting the raking reel (not shown). Sub-frame 9 is pivotally supported at its forward end at 10 on a bracket 11 fixed to the chassis 1 and the rear portion of sub-frame 9 is linked at 12 to a bell crank lever 13 which may be actuated through the crank 14 and the rod 15 having its end threadedly received in sleeve 16 to raise or lower the rear section of the sub-frame 9. The rod 15 is supported through a bearing 17 trunnioned on bracket 18 and a spring 19 under compression between the bearing 17 and crank 14 provides a resilient floating support for the rear end of the sub-frame 9. The hydraulic cylinder 20, medially pivoted lever 21, and connecting rod 22 between lever 21 and bell crank lever 13 merely illustrate a conventional alternative mechanism for raising or lowering the sub-frame 9 from the tractor through usual hydraulic means connected to the cylinder 20, as will be readily understood by those skilled in the art.

The resiliently extensible support 23 for the forward or hitch end of the rake chassis in the preferred embodiment comprises a pair of relatively slideable telescopically associated tubular metal sections 24 and 25. Housed within these tubular sections 24, 25 is a compression spring 26 which, as will be seen in Figure 2, thrusts against the relatively remote ends 27 and 28 of the respective sections.

In order to limit the extensibility of the support 23, suitable stop means is provided in the form of a boss or stud 29 on the inner section 25 projecting outwardly and moveable longitudinally through a slot 30 in section 24 into abutting engagement with a stop plate 31 which is welded across the lower end of slot 30 as may best be seen by reference to Figure 5 of the drawings.

Means for securing or locking the telescoping sections 24 and 25 against relative movement to thus fix the length of the support 23 at any of various selected lengths may conveniently comprise a set screw 32 threaded through the stop plate 31 and having a right angularly disposed operating handle 33 to facilitate turning it into or out of locking engagement with the inner section 25.

As has already been mentioned, the support 23 is pivotally supported on the chassis 1 for fore-and-aft swinging movement between the depending operative positions illustrated in full lines in Figures 1 and 2 and the rearwardly upwardly swung retracted position illustrated in broken lines in Figure 2. In order to provide such a pivotal connection, the cover plate 28 at the upward end of tubular section 24 is provided with an integral upwardly bent extension terminating in a hinge knuckle 34 which is disposed between the opposed sides of the channel-shaped clevis furcation 5. A pintle 35 passed through the opposite sides of said channeled furcation 5 and through the knuckle 34 completes the pivotal connection.

In this arrangement it will be noted that the forward swinging movement of the support or leg 23 is limited by engagement between the end 28 of tubular member 24 and the downwardly presented surface of the horizontal portion of the channel member 5. Preferably the end plate 27 at the lower end of telescoping section 25 is extended laterally beyond the sides of section 25 to provide an adequate ground engaging base or pedestal for the support 23 as shown.

If desired, suitable releasable means may be provided for maintaining the support 23 in depending or erected position in order to avoid accidental collapse of the forward end of frame 1. Such means may conveniently embody a section of chain 36 having one end secured to telescoping section 24 as by welding at 37. At its other or free end the chain 36 may carry a usual bayonet slotted fastening tab 38 adapted for coaction in usual manner with the stud 39 on clevis section 5. The same chain 36 may also be utilized for securing the support 23 in raised or retracted position as illustrated in Figure 2. In such event, the tab 39 may be hooked over the stud 40 on the upper clevis member 4 as shown in Figure 2.

The base 27 is of relatively narrow dimensions in a fore-and-aft direction so that the support 23 may be rocked forwardly on the base 27 thus permitting bringing the chassis forwardly from the position of Figure 1 into coupling relation with the drawbar 6 wherein the apertures 4' and 5' of the chassis hitch element are vertically aligned with the drawbar aperture 6'. Inasmuch as the support 23 provides a resilient floating support for the forward hitch portions 4 and 5 of the chassis 1, it will be seen that the forward end of the chassis 1 may be manually deflected upwardly or downwardly on the support 23 while, at the same time, the rake chassis is manually pulled forwardly toward the drawbar 6 of the tractor, such forward movement being permitted by virtue of the tilting action of the support 23 about its pivot 35 as above mentioned. Such tilting of the support 23 may be permitted either by disconnecting the chain 36 from its stud 39 or preferably by allowing enough slack in the chain 36 to permit movement of the hitch elements 4 and 5 from substantially the position of Figure 1 into coupling relation with the tractor drawbar 6 substantially as in Figure 2.

In the event the rake frame or chassis 1 is located an appreciable distance from the drawbar 6 we have conceived a novel and highly practical method of maneuvering the said chassis into proper coupling position with the drawbar 6. To this end, the farmer or workman merely grasps the front end portion of the rake frame 1, preferably at the hitch portion 4 thereof and periodically presses downwardly and lifts upwardly thereon at a frequency which is substantially equal to the natural frequency of oscillation of the rake frame 1 about it axis of oscillation defined by the rear axle 3. Each tim the forward end of the chassis 1 is near the peak o upper extremity of its oscillating motion, it will be appar ent that the pedestal 27 of the support 23 will eithe have bounced clear of the ground or else will engage the ground with such a small amount of pressure tha the chassis 1 may be readily pulled forwardly or swung laterally in any direction as necessary to bring the hitch portions 4 and 5 into proper proximity to the drawba 6. Preferably during such maneuvering of the frame 1 the chain 36 will be secured in the manner illustrated in Figure 2 to prevent rearward folding of the support 23. In some cases it will be found practical to regulate the amplitude of oscillation so that at one extremity of oscillation the hitch portions are positioned at the proper height for reception of the drawbar, and while they are thus positioned to cause such relative horizontal movement between the hitch portion and drawbar as is necessary to complete the coupling of these parts. As soon as the clevis members 4 and 5 are disposed in operative relation to the drawbar 6 and the pin 8 is operatively positioned as shown in Figure 2, the chain 36 may be released and the tractor 7 moved forwardly to tilt the support 23 on its base so that it may be swung upwardly to inoperative position, whereupon the chain 36 may be reconnected to the stud 40 to thus retain support 23 in its retracted position.

When it is desired to uncouple the rake frame 1 from the tractor drawbar 6, chain 36 is disconnected from the stud 40 to permit downward swinging of the support 23 by gravity until its base 27 engages the ground. At this time backing the tractor and rake frame will cause the support 23 to tilt forwardly about its base 27 to erect position, and in so swinging the ground pressure on the support 23 will automatically compress the same to the proper height for cooperation with the particular drawbar 6. Before uncoupling the tractor and chassis, the set screw 32 may be turned into locking engagement with the telescoping section 25 to thus prevent relative movement between the sections 24 and 25 and thus maintain the support 23 at its adjusted length. Thus, after the hitch pin 8 is removed and the tractor driven away, the support 23 will maintain the hitch portion 4 and 5 of the frame 1 accurately at the proper height for recoupling to the drawbar 6 without necessity for further adjustment. In such case, it will be necessary simply for the operator to back the tractor until its drawbar 6 is received between the furcations 4 and 5 whereupon the coupling may be completed in well known manner.

Thus, by virtue of the resilient extensibility of the support 23 and its pivotal connection 35 with the chassis 1 it is possible for the operator to simultaneously adjust the height of the hitch 4 and 5 to the proper level and draw the chassis 1 forwardly for operative association with the tractor drawbar 6. Moreover, as an incident of the uncoupling of the tractor and the chassis 1 and the erection of the support 23, the support is automatically adjusted to proper length and may be locked at such length to facilitate recoupling of the tractor and chassis. It will be further apparent that there is disclosed a novel and highly useful method of maneuvering the rake frame 1 in any horizontal direction as required to properly position it for coupling to the drawbar of the tractor.

Having thus described our invention, we claim:

1. In a semi-trailer, a rigid chassis having a forward end and a rear end, ground wheels supporting said rear end and providing generally horizontal axes about which the chassis is pivotal, a hitch element affixed to said forward end for connection to a vehicle drawbar spaced from it, the center of gravity of said chassis being forwardly of said axes, and vertically oscillatable support means connected to said forward end and projecting downwardly therefrom to the ground, said oscillatable support means comprising a spring extensively deflectable vertically and extending between said forward end and the ground, spring engaging means limiting lateral deflection of the spring while permitting relatively free vertical deflection thereof, said spring having an upper end and a lower end, means pivotally connecting said upper end to said forward end of said chassis for pivotal movement relative thereto upon bodily movement of said chassis, and fixed means at said lower end of said spring resting on the ground and rockable on the ground upon said bodily movement of the chassis, said oscillatable support means being manually operable to position said hitch element at the same height as the height of said drawbar to permit the space between the hitch element and drawbar to be closed and the hitch readily connected to the drawbar upon bodily movement of said chassis.

2. In a semi-trailer as recited in Claim 1, wherein means connected between said spring and chassis is provided for limiting the pivoting of the upper end of said spring relative to the chassis and the rocking of the lower end on the ground on bodily movement of the chassis.

3. In a semi-trailer as recited in Claim 1, wherein the spring engaging means for limiting lateral deflection of the spring while permitting relatively free vertical deflection thereof comprises upper and lower relatively slidable tubular telescopic members extending vertically, said spring comprising an elongate compression spring extending through both of said telescopic members, from the upper end of the upper member to the lower end of the lower member.

4. A semi-trailer as recited in Claim 3 wherein said pivotal connecting means is interposed between the upper end of the upper telescopic member and the forward end of said chassis, said rocking means resting on the ground comprising a flat base member at the lower end of the lower telescopic member, and a flexible member connecting said upper telescopic member and said chassis for limiting the pivoting and rocking of said spring.

References Cited in the file of this patent

UNITED STATES PATENTS

| 1,617,714 | Jones | Feb. 15, 1927 |
| 2,634,941 | Eckert | Apr. 14, 1953 |

FOREIGN PATENTS

| 464,565 | Canada | Apr. 25, 1950 |
| 857,221 | France | Apr. 8, 1940 |
| 721,158 | Germany | May 28, 1942 |
| 260,696 | Great Britain | Nov. 11, 1926 |